United States Patent [19]
Fort et al.

[11] Patent Number: 5,791,830
[45] Date of Patent: Aug. 11, 1998

[54] FEED SYSTEM FOR PARTICULATE MATERIAL AND TRANSITION HOPPER THEREFOR

[75] Inventors: Wesley C. Fort, Norcross; Chris D. Wujcik, Alpharetta; Dennis W. Dodge, Peachtree; Lee R. Baker, Norcross, all of Ga.

[73] Assignee: Nordson Corporation, Westlake, Ohio

[21] Appl. No.: 836,996

[22] PCT Filed: Nov. 7, 1995

[86] PCT No.: PCT/US95/14474

§ 371 Date: May 8, 1996

§ 102(e) Date: May 8, 1996

[87] PCT Pub. No.: WO96/15057

PCT Pub. Date: May 23, 1996

Related U.S. Application Data

[63] Continuation-in-part of Ser. No. 336,972, Nov. 10, 1994, abandoned.

[51] Int. Cl.[6] .................................................. B05G 53/24
[52] U.S. Cl. ........................... 406/151; 406/152; 406/154; 406/173
[58] Field of Search ............................. 406/151, 152, 406/153, 154, 168, 173

[56] References Cited

U.S. PATENT DOCUMENTS

| 2,744,792 | 5/1956 | Finn | 406/173 |
|---|---|---|---|
| 3,186,768 | 6/1965 | Pendleton | 406/168 |
| 3,423,130 | 1/1969 | Milner | 406/168 |
| 3,776,600 | 12/1973 | McLeod | 406/168 |
| 4,790,455 | 12/1988 | Dieringer et al. | 222/146.2 |
| 5,006,018 | 4/1991 | Depew | 406/152 |
| 5,378,089 | 1/1995 | Law | 406/153 |

FOREIGN PATENT DOCUMENTS

| 528755 A1 | 2/1993 | European Pat. Off. | 406/151 |
|---|---|---|---|
| 164066 | 12/1981 | Japan | |
| 177159 | 10/1984 | Japan | |
| 44074 | 3/1985 | Japan | |
| 257873 | 12/1985 | Japan | |
| 55978 | 4/1986 | Japan | |

*Primary Examiner*—Gary C. Hoge
*Attorney, Agent, or Firm*—Paul E. Milliken, Esq.

[57] ABSTRACT

This invention relates to a feed system for conveying loose pieces of a coarse particulate or pelletized hot melt material such as adhesives from a storage container to a melt tank. The system includes a transition hopper having insulation between the hopper and the melt tank to prevent premature melting of the loose adhesive pellets or pieces before they pass into a melt tank. An air supply for providing air pressure to the interior of the hopper can be attached to the hopper to prevent vapors from rising from the hot melt tank into the transition hopper and a vent opening for exhausting vapors from the hot melt tank can be located in the top of the melt tank.

31 Claims, 3 Drawing Sheets

FEED SYSTEM FOR PARTICULATE MATERIAL AND TRANSITION HOPPER THEREFOR

RELATED INVENTIONS

This application is the US National Phase of International Application Number PCT/US95/14474, filed 7 Nov., 1995, published as WO96/15057 May 23, 1996, which is a continuation-in-part of Ser. No. 08/336,972, filed Nov. 10, 1994 which is now abandoned.

FIELD OF INVENTION

This invention relates to a feed system for coarse particulate meltable material in the form of pellets, slats, minislats and the like, and in particular to a vacuum feed system for loose unmelted pieces of hot melt adhesives including a transition hopper to prevent premature melting of the loose pieces of material before they pass into a melt tank.

BACKGROUND OF THE INVENTION

Various types of vacuum or air pressure feed systems for particulate material are known in the prior art. Typical examples of such systems are shown and described in U.S. Pat. Nos. 4,299,683, (Adorno et al.), 4,532,860, (Simson), 4,344,723, (Ellingson), 4,583,885, (Thiele), and 4,569,293, (Evenson).

U.S. Pat. No. 5,006,019, (Dziedzic, Jr et al.) shows a specific design of a pneumatic pickup probe or wand for picking up a dry flowable material such as pelletized resin from a storage container and introducing that material into a vacuum conveyer system which transports it to a molding or extrusion press.

The term "particulate material" as used herein means coarse pieces of meltable stock material such as hot melt material. The pieces may be in the form of round pellets, or rectangular slats, for example of a size such as ¼"x1½"x2½" or may be in other sizes or shapes.

A problem of premature melting is sometimes encountered in a vacuum conveyer or feed system when meltable pelletized or particulate material is transported through a feed system to a heated melt tank if the heat from the melt tank migrates into the feed system and causes certain portions of the feed system to reach or exceed the melting temperature of the material being conveyed to the melt tank. Such premature melting can cause sticking of release or outlet valves in the system or can cause bridging of the material when it reaches a temperature at which it melts or becomes tacky. The material can build up on interior walls of the feed system and ultimately close off the flow of materials to the melt tank. This is premature melting can be a serious problem in feed systems which feed melt tanks which may be heated to a temperature of as much as 232° C., (450° F.) when operating.

In addition to premature melting of the material being fed to the melt tank, vapors can rise from the melt tank and condense in the feed system causing blockage of the flow of material being fed.

OBJECTS OF THE INVENTION

In is an object of this invention to provide a transition hopper between a loader of pelletized meltable material and a melt tank for such material which reduces heat transfer from the melt tank to the loader.

Another object of the invention is to provide a transition hopper for a feed system for pelletized meltable material which is easy to install in a new system or to retrofit into an existing system.

A still further object of the invention is to provide a pressurized transition hopper for a feed system for conveying pelletized meltable material to a melt tank with a means of venting sticky hot melt condensate from the melt tank to prevent the condensate from entering the transition hopper.

Still another object of the invention is to provide a transition hopper for a feed system for pelletized hot melt materials which reduces sticking of valves in the system or build-up of material on the interior surfaces of the feed system equipment by reducing the heat transfer from a hot melt tank to the feed system.

An even further object of the invention is to permit a reduced distance between a feed system for particulate meltable materials and a melt tank without excessive heat transfer from the melt tank into to the feed system.

These and other objects of the invention will become more fully apparent in the following specification and the attached drawings.

SUMMARY OF THE INVENTION

This invention is a transition hopper for a feed system for conveying a particulate material from a storage container to a melt tank, where the system includes a loader having a means for withdrawing particulate material from the storage container, an outlet opening, and means periodically releasing particulate material from the outlet opening, and a melt tank for receiving and melting the particulate material released from the loader located a spaced distance below the loader, the melt tank having an inlet opening, the transition hopper comprising: a vertically extending duct member having a top attachment means for connection to the loader at its outlet opening, and bottom attachment means for connection to the melt tank at its inlet opening; and heat transfer reduction means to lessen the amount of heat passing from the melt tank to the outlet opening of the loader.

DESCRIPTION OF THE PREFERRED EMBODIMENTS

Figure 1:
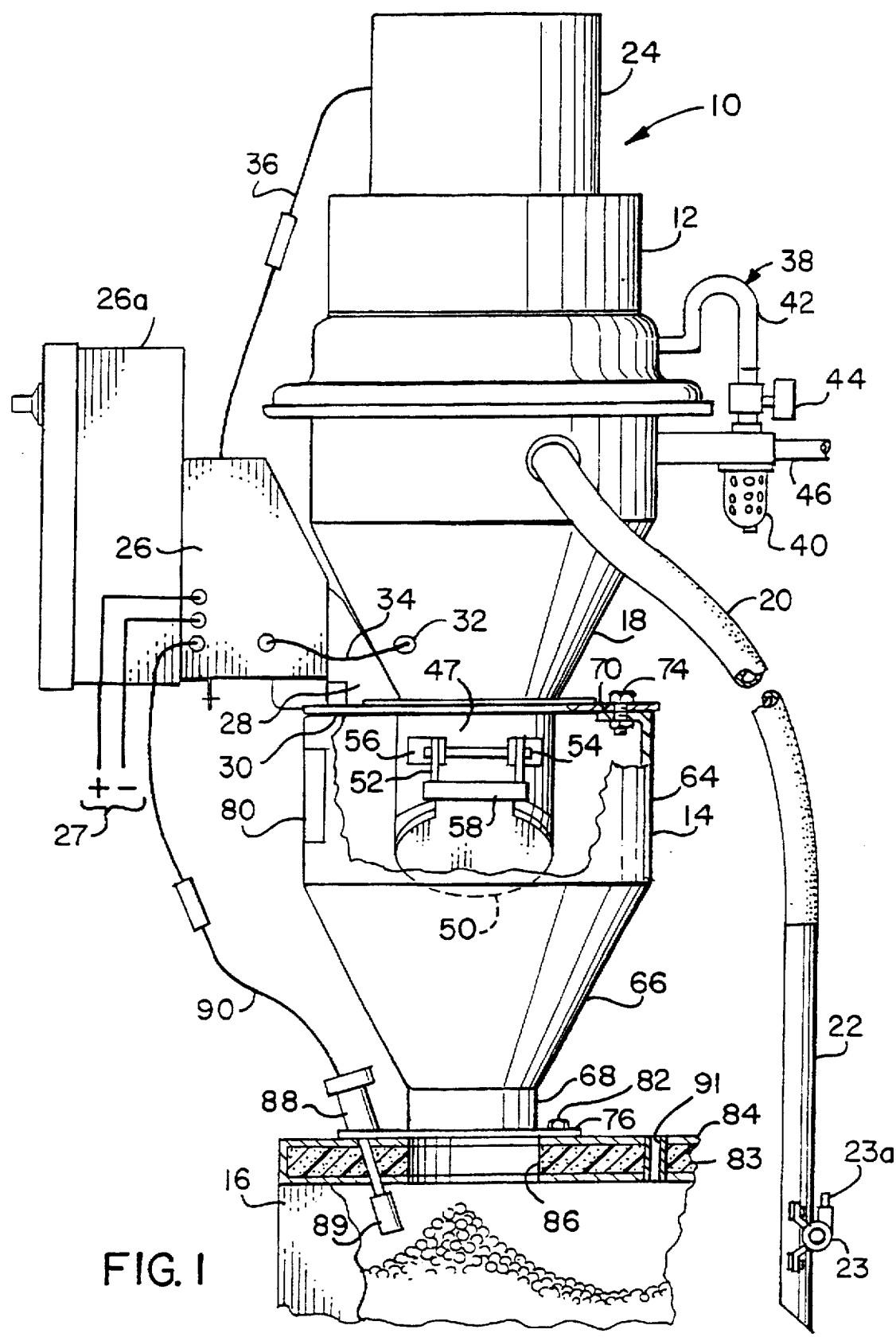
FIG. 1 shows a side elevation view of the feeder system of the invention with portions broken away to show the interior of portions of the equipment.

Referring to FIG. 1 the entire vacuum feed system for a pelletized hot melt adhesive is indicated generally by the numeral 10. The feed system 10 has a vacuum loader 12 which feeds downwardly through a transition hopper 14 and into a melt tank 16.

Figure 4:
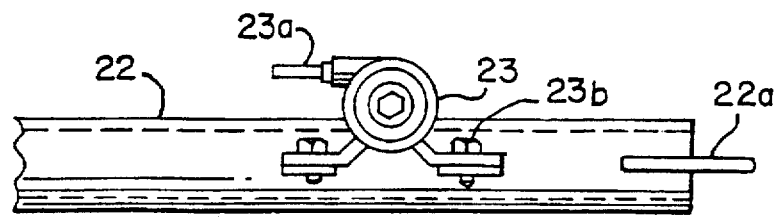
FIG. 4 is a fragmentary side elevational view of the material intake tube and tube vibrator of the invention.
Figure 5:
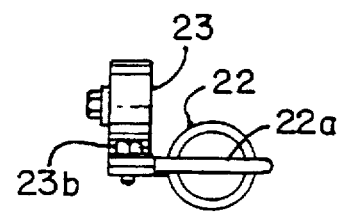
FIG. 5 is an end view of the tube and vibrator shown in FIG. 4 looking toward the intake end of the tube.

The loader 12 has a loader hopper 18 to which is connected on end of an intake hose 20 having an intake tube 22 at the opposite end thereof. In use, the free end of the intake tube 22 is inserted in a container (not shown) of pelletized hot melt adhesive or any other meltable particulate material to be received by the loader 12. The loader has an electric vacuum motor 24 which creates a vacuum inside of the loader hopper 18 and causes pelletized or particulate material to be drawn from a container through the tube 22, the hose 20 and through a filter (not shown) inside the loader hopper 18. A vibrator 23 is attached to the tube 22 near the intake end thereof by bolts 23b or other suitable means. The vibrator 23 shown in more detail in FIGS. 4 and 5, has a compressed air intake 23a for connection to a compressed air line (not shown). The interior of the vibrator 23 is not shown in detail since the construction of such devices is known. One such pneumatic vibrator is one having a loose ball inside a housing which is caused to vibrate inside a housing when compressed air enters the housing. The intake tube 22 shown in FIGS. 4 and 5 has a stand-off loop 22a on the end thereof to prevent the end from being drawn against a flat surface and blocking intake of material into the tube. The tapered end shown on the tube 22 in FIG. 1 can also serve the same purpose.

An electric powered vibrator could also be used. Vibration of the tube 22 reduces the tendency of the particulate material to clog up at the intake end of the tube 22.

A junction box 26 for providing power and control to the motor 24 is mounted by a bracket 28 on a mounting plate 30 at the bottom of the loader hopper 18. The junction box 26 has power input lines 27 connected to a suitable power source (not shown). A control panel 26a is mounted on the front of the junction box 26 and is electrically connected thereto.

The loader has a fill sensor 32 connected through a signal line 34 to the junction box 26 to turn off the motor 24 when the material in the hopper 18 reaches a certain designated level. The hopper 18 may also be filled above the sensor 32 by use of a timer which delays the shut-off of the vacuum motor 24 for a certain period of time after the material level in the hopper 18 reaches the sensor 32. A motor power line 36 extends from the junction box 26 to the motor 24. The loader 12 also has a air pressure blowout cleaning system 38 for cleaning the filter inside the loader 12. The system includes a filter 40, an air pressure line 42 a control solenoid valve 44 electrically connect by a line (not shown) into the junction box 26, and a compressed air source line 46 which is connected into a source of compressed air (not shown).

Figure 2:
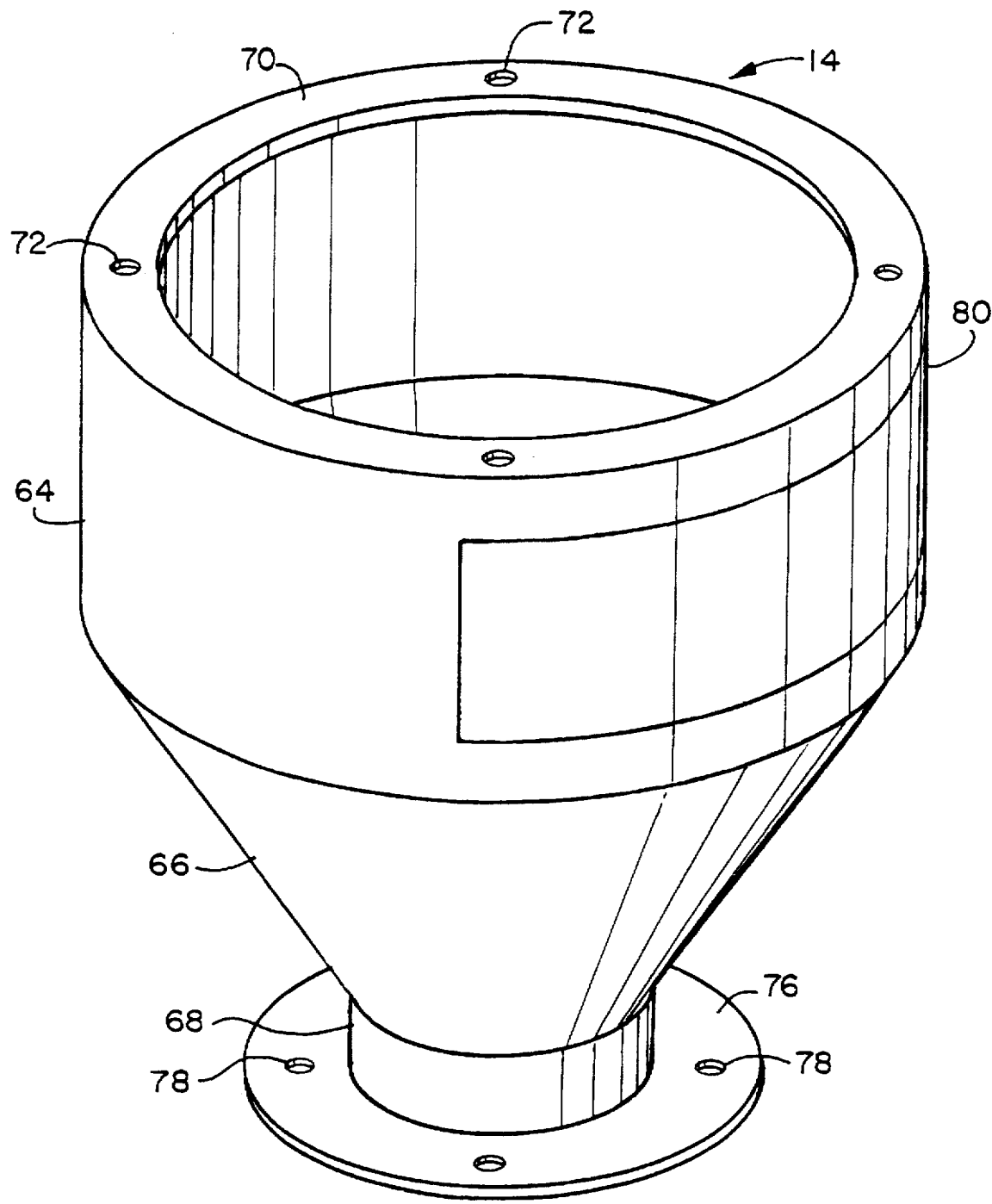
FIG. 2 shows an enlarged perspective view of the transition hopper of the invention.
Figure 3:
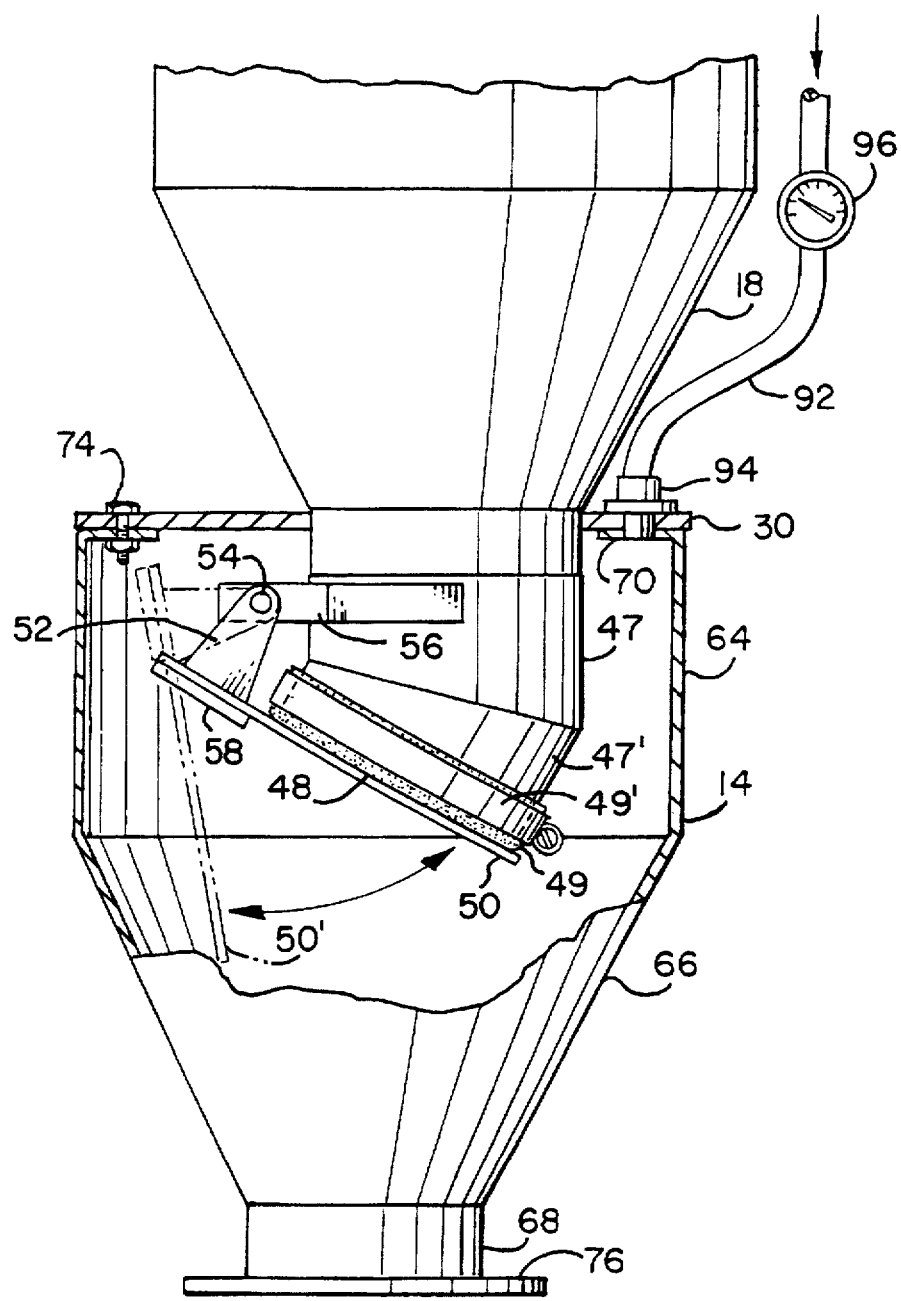
FIG. 3 shows a fragmentary front elevation view of the loader hopper and transition hopper of the invention with portions broken away to show the details of the loader outlet valve.

The loader hopper 18 has a downwardly extending outlet duct 47 having an inclined lower end portion 47' which has an outlet opening 48 having a resilient seal ring 49 at the bottom thereof which is intermittently closed by an outlet door or valve 50 which is in contact with the seal ring 49 when the valve 50 is closed. The seal ring 49 is held on the outlet end of the duct 47 by a clamp ring 49'. The valve 50 is mounted on arms 52 which in turn are attached to a pivoted shaft 54 supported by brackets 56 attached to the mounting outlet duct 47 of the hopper 18. The arms 52 have a counterbalance weight 58 (as shown in FIG. 3) which permits the valve 50 to swing open in a downward direction when the hopper 18 is loaded and the vacuum motor 12 is stopped. The transition hopper 14 (as shown in FIGS. 1 and 2) has an upper cylindrical portion 64, an intermediate frustoconical portion 66, and a lower cylindrical portion 68.

The upper portion 64 has an annular radially inwardly extending top mounting flange 70 having spaced holes 72 therein for receiving bolts 74 to fasten the flange 70 to the mounting plate 30 as shown in FIG. 1. Preferably the holes 72 have weldnuts at the bottom thereof for engaging the bolts 74. The hopper 14 has, at the bottom of the lower cylindrical portion, an annular radially outwardly extending bottom flange 76 having spaced holes 78 (as shown in FIG. 2). The hopper 14 has an access door 80 to reach the interior of the hopper 14 for maintenance.

As shown in FIG. 1, the transition hopper 14 is attached to the top of the melt tank 16 by bolts 82 through holes 78 and in flange 76. The hopper 14 is mounted directly above an insulation panel 83 which may be enclosed in a jacket or cover plate 84. In many instances the insulation panel replaces a lid which covers the inlet opening of the melt tank 16. The lower portion 68 of hopper 14 serves as the outlet opening of the hopper and this is in axial alignment with an inlet opening 86 in the insulation panel 83.

An RF capacitance level switch 88 has a probe 89 which extends through the insulation panel 83 into the interior of the melt tank 16 in a position adjacent to the inlet opening 86 to sense when the melt tank is full or in need of more meltable material and sends a signal through a line 90 to the junction box 26 to turn on or off the motor 24. The probe 89 operates on the basis of capacitance due to proximity to the material and never touches the material.

The melt tank 16 has a vent port 91 extending through the insulation panel 83 and the cover plate 84 to provide venting of sticky hot melt condensate which may form within the melt tank and lowers the temperature within the hopper 14 to prevent premature melting of the hot melt material which may result in sticking of the outlet valve 50 or bridging or accumulation of hot melt material on the interior wall of the hopper 14 or on the valve 50.

In addition to venting the melt tank 16, it has been found that the vapors from the hot melt material in the melt tank 16 can be prevented from rising in the hopper 14 by injecting air pressure into the top of the hopper 14 through an air pressure line 92 which is connected through a suitable fitting 94 attached to the mounting plate 30 and having its inlet end connected through a regulator 96 to an air pressure source such as the line 46 in FIG. 1 or other air pressure source not shown. The outlet end of the air pressure line 92 can be attached at any location in the top portion of the hopper 14 as long as it communicates with the interior of the hopper near the upper end. This location results in a downward pressure from the top of the hopper 14 to prevent rising of the hot melt vapors.

The injected air pressure not only prevents hot melt vapors from rising in the hopper 14 but it can also serve as cooling air to prevent the heat from the melt tank 16 from traveling upwardly in the hopper 14 toward the loader hopper 18 where it could cause premature melting of the stock material and a blockage of the outlet of the loader hopper 18. The air pressure in the hopper 14 also provides pressure in the area of the vent port 91 thereby increasing the venting of the hot melt vapors from the melt tank 16.

In operation, the probe 89 maintains a constant level of material in the melt tank 16 by sensing when more material is needed and sending a signal through line 90 to the control or terminal box 26 to start the vacuum motor 24 which creates a vacuum in the hopper 18 which holds the outlet valve 50 in the closed position against the outlet opening 48 of the hopper 18. With the intake tube 22 inserted in a hot melt material storage container (not shown) the vacuum draws the pelletized material through the tube 22 and intake hose 20 into the loader hopper where it accumulates until the fill sensor 32 sends a signal through line 34 to terminal box to turn off the motor 24. Once the motor 24 is turned off and a vacuum is no longer being drawn on the hopper 18, the weight of pelletized material accumulated in the hopper 18 causes the valve to open and swing downwardly as shown in the chain dotted lines indicated as valve 50' permitting the material to fall by gravity through the hopper 14 into the inlet opening 86 of the melt tank 16. Each time the melt tank 16 needs more material to maintain the desired operating level the probe 89 sends a signal through the junction box 26 to restart the vacuum motor 12 and move additional pelletized material from a storage tank to the melt tank 16.

During operation, the melt tank 16 may reach as high as 232° C., (450° F.) and it is most important to reduce the heat transfer of such high temperatures to the area of the outlet valve 50 of the loader hopper 18 since such heat would cause premature melting of the material which would result in sticking of the valve.

By use of the insulating panel 83, the vent port 91 and the air pressure injected into the hopper 14 through the line 92, the temperature within the transition hopper can be maintained at no more than 49° C., (120° F.), which is below the melting point of any material being conveyed through the feed system. Limiting the temperature of the transition hopper 14 also eliminates the danger of burns from inadvertently touching the outside of the hopper. The venting of the hopper 14 through the panel 83, not only reduces the temperature within the hopper but removes sticky condensate of the hot melt material directly from the melt tank 16 before it can enter the hopper 14.

It should be understood that the shape of the transition hopper, the outlet valve structure, the location or type of venting in the melt tank and the structure or material of the insulation panel can differ from those shown in this application and various other modifications can be made in the structure shown and described herein without departing from the scope of the invention.

We claim:

1. A vacuum feed system for conveying a particulate material from a storage container to a melt tank, the system comprising:

a vacuum loader having a means for withdrawing particulate material from the storage container, an outlet opening, and means periodically releasing particulate material from the outlet opening;

a melt tank for receiving and melting the particulate material released from the vacuum loader located a spaced distance below the vacuum loader, said melt tank having an inlet opening;

a transition hopper interconnecting the vacuum loader and the melt tank to direct the particulate material released from the vacuum loader to the inlet opening of the melt tank;

pressure means for injecting air pressure into the transition hopper to prevent vapors from the hot melt tank from rising in the transition hopper and condensing on inner surfaces thereof to cause misfeed or blockage of material passing through the transition hopper; and heat transfer reduction means to lessen the amount of heat passing from the melt tank to the outlet opening of the vacuum loader.

2. A feed system as claimed in claim 1 wherein the heat transfer reduction means is a vent means in the melt tank.

3. A feed system as claimed in claim 2 wherein the vent means is a vent port through a top panel of the melt tank.

4. A feed system as claimed in claim 1 wherein the heat transfer reduction means is a layer of insulation between the bottom of the transition hopper and the top of the melt tank.

5. A feed system as claimed in claim 4 wherein the heat transfer reduction means includes an air space adjacent to one side of the insulation layer.

6. A feed system as claimed in claim 1 wherein the means releasing particulate material from the outlet opening of the vacuum loader is a hinged outlet valve that bears against the outlet opening in the closed position and swings downwardly inside the transition hopper in the open position.

7. A feed system as claimed in claim 6 wherein the heat transfer reduction means limits the temperature in the area of the outlet valve to a temperature below the melting point of particulate material which may pass through the outlet opening and therefore prevent sticking of the valve due to premature melting or tackiness of the particulate material.

8. A feed system as claimed in claim 1 wherein the heat transfer reduction means limits the temperature within the transition hopper to prevent the particulate material from melting or becoming tacky which might cause it to stick to interior surfaces of the hopper.

9. A feed system as claimed in claim 1 wherein the heat transfer reduction means limits the temperature at the top of transition hopper to no more than 49° C. (120° F.) when the temperature within the melt tank reaches a temperature as high as 232° C. (450° F.).

10. A feed system as claimed in claim 1 wherein the transition hopper is of circular shape around a vertical axis and tapers from a larger diameter at the top to a smaller diameter at the bottom.

11. A feed system as claimed in claim 10 wherein the transition hopper has a cylindrical top portion, a frustoconical intermediate portion and a cylindrical bottom portion of smaller diameter than the top portion, and a radially extending annular flange at both the top and bottom of the hopper for attaching the hopper respectively to the vacuum loader and the melt tank.

12. A feed system as claimed in claim 1 wherein the means for withdrawing particulate material from the storage container includes an intake tube for insertion into the storage container, means operatively connecting the intake tube with an intake opening of the loader, and means for vibrating the intake tube to reduce clogging of the particulate material at the intake end of the intake tube.

13. A feed system as claimed in claim 12 wherein the means for vibrating the intake tube is driven by compressed air.

14. A feed system as claimed in claim 1 wherein the pressure means is an air pressure line connected through a pressure regulator to an air pressure source at its inlet end and having its outlet end connected to the transition hopper and in communication with the interior of the transition hopper.

15. A feed system as claimed in claim 14 wherein the air pressure line has its outlet connected to the transition hopper in communication with an upper portion of the hopper.

16. A vacuum feed system for conveying a particulate material from a storage container to a melt tank, the system comprising:

a vacuum loader having a means for withdrawing particulate material from the storage container, an outlet opening, and means periodically releasing particulate material from the outlet opening;

a melt tank for receiving and melting the particulate material released from the vacuum loader located a spaced distance below the vacuum loader, said melt tank having an inlet opening;

a transition hopper interconnecting the vacuum loader and the melt tank to direct the particulate material released from the vacuum loader to the inlet opening of the melt tank; and a vent means in the melt tank to lessen the amount of heat passing from the melt tank to the outlet opening of the vacuum loader.

17. A transition hopper for a feed system for conveying a particulate material from a storage container to a melt tank, where the system includes a loader having a means for withdrawing particulate material from the storage container, an outlet opening, and means periodically releasing particulate material from the outlet opening, and a melt tank for receiving and melting the particulate material released from the loader located a spaced distance below the loader, said melt tank having an inlet opening, the transition hopper comprising:

a vertically extending duct member having a top attachment means for connection to the loader at its outlet opening, and bottom attachment means for connection to the melt tank at its inlet opening;

pressure means for injecting air pressure into the vertically extending duct member to prevent vapors from the hot melt tank from rising in the duct member and condensing on inner surfaces thereof to cause misfeed or blockage of material passing through the transition hopper; and heat transfer reduction means to lessen the amount of heat passing from the melt tank to the outlet opening of the loader.

18. A transition hopper as claimed in claim 17 wherein the heat transfer reduction means is a vent means in the melt tank providing communication between the inside and outside of the melt tank.

19. A transition hopper as claimed in claim 18 wherein the vent means is a vent port through a top panel of the melt tank.

20. A transition hopper as claimed in claim 17 wherein the heat transfer reduction means is a layer of insulation at the bottom of the hopper.

21. A transition hopper as claimed in claim 20 wherein the layer of insulation is made of a rigid insulating material.

22. A transition hopper as claimed in claim 17 wherein the heat transfer reduction means is the combination of a vent means in the duct member providing communication between the inside and outside of the duct member and a layer of insulation at the bottom of the duct member.

23. A transition hopper as claimed in claim 17 wherein the duct member is of circular shape around a vertical axis and tapers from a larger diameter at the top to a smaller diameter at the bottom.

24. A transition hopper as claimed in claim 23 wherein the duct member has a cylindrical top portion, a frustoconical intermediate portion and a cylindrical bottom portion of smaller diameter than the top portion, and a radially extending annular flange at both the top and bottom of the duct member for attaching the hopper respectively to the loader and the melt tank.

25. A transition hopper as claimed in claim 24 wherein the flange at the top of the duct member is a radially inwardly extending flange and the flange at the bottom of the duct member is a radially outwardly extending flange.

26. A transition hopper as claimed in claim 17 having the top attachment means of the duct member connected to a loader at its outlet opening and including an outlet valve on the loader which bears against the outlet opening of the loader in the closed position and which moves into the duct member in the open position.

27. A transition hopper as claimed in claim 26 wherein the heat transfer reduction means limits the temperature in the area of the outlet valve to a temperature below the melting point of particulate material which may pass through the outlet opening and therefore prevent sticking of the valve due to premature melting or tackiness of the particulate material.

28. A transition hopper as claimed in claim 17 wherein the heat transfer reduction means limits the temperature within the transition hopper to prevent melting or tackiness of the particulate material which might cause it to stick to the interior surfaces of the hopper.

29. A transition hopper as claimed in claim 17 wherein the heat transfer reduction means limits the temperature at the top of the hopper to no more than 49° C. (120° F.) when the temperature within any melt tank to which the hopper may be connected reaches as high as 232° C., (450° F.).

30. A transition hopper as claimed in claim 17 wherein the pressure means is an air pressure line connected through a pressure regulator to an air pressure source at its inlet end and having its outlet end connected to the vertically extending duct member and in communication with the interior of the duct member.

31. A transition hopper as claimed in claim 30 wherein the air pressure line has its outlet connected to the duct member in communication with an upper portion of the duct member.

* * * * *